United States Patent
Griess et al.

(10) Patent No.: US 11,110,668 B2
(45) Date of Patent: Sep. 7, 2021

(54) APPARATUS AND METHOD FOR FACILITATING A VACUUM BAGGING OPERATION DURING FABRICATION OF A COMPOSITE LAMINATE

(71) Applicant: The Boeing Company, Chicago, IL (US)

(72) Inventors: Kenneth H. Griess, Kent, WA (US); Gary E. Georgeson, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 223 days.

(21) Appl. No.: 16/018,317

(22) Filed: Jun. 26, 2018

(65) Prior Publication Data

US 2019/0389152 A1    Dec. 26, 2019

(51) Int. Cl.
*B29C 70/44*     (2006.01)
*B29C 70/54*     (2006.01)
*G01B 11/16*     (2006.01)
*G01L 1/24*      (2006.01)

(52) U.S. Cl.
CPC .............. *B29C 70/44* (2013.01); *B29C 70/54* (2013.01); *G01B 11/162* (2013.01); *G01L 1/24* (2013.01); *B29C 2945/76103* (2013.01); *B29C 2945/76461* (2013.01); *B29C 2945/76481* (2013.01); *B29C 2945/76498* (2013.01); *B29C 2945/76501* (2013.01); *B29C 2945/76588* (2013.01)

(58) Field of Classification Search
USPC .......................................... 264/511; 427/294
See application file for complete search history.

(56) References Cited

U.S. PATENT DOCUMENTS

| | | | | |
|---|---|---|---|---|
| 5,094,527 A  * | 3/1992  | Martin    | G01M 11/086  |
|               |         |           | 356/32       |
| 5,106,568 A  * | 4/1992  | Honka     | B29C 70/44   |
|               |         |           | 156/286      |
| 5,569,342 A  * | 10/1996 | Gould     | B29C 63/0056 |
|               |         |           | 156/273.1    |
| 9,358,764 B2 * | 6/2016  | Prebil    | B29C 66/7392 |
| 9,446,575 B1 * | 9/2016  | Georgeson | G01K 13/00   |
| 10,029,825 B2* | 7/2018  | Seegel    | B65D 33/004  |
| 2007/0017297 A1* | 1/2007 | Georgeson | G01N 29/069  |
|               |         |           | 73/801       |
| 2008/0211130 A1* | 9/2008 | Rydin    | B29C 33/405  |
|               |         |           | 264/102      |

(Continued)

OTHER PUBLICATIONS http://www.gom.com/metrology-systems/aramis.html.

(Continued)

*Primary Examiner* — Brian K Talbot
(74) *Attorney, Agent, or Firm* — Walters & Wasylyna LLC

(57) ABSTRACT

A method is provided for facilitating a vacuum bagging operation during fabrication of a composite laminate. The method comprises applying a vacuum bag over a composite part to fabricate the composite laminate from the composite part. The method also comprises drawing a vacuum in the vacuum bag, and monitoring one or more portions of the vacuum bag for strain within the vacuum bag when the vacuum is drawn. The method further comprises manipulating the vacuum bag to even out strain within the vacuum bag.

23 Claims, 4 Drawing Sheets

(56) References Cited

U.S. PATENT DOCUMENTS

| | | | | |
|---|---|---|---|---|
| 2008/0308960 | A1* | 12/2008 | Rydin | B29C 43/56 264/102 |
| 2009/0243128 | A1* | 10/2009 | Nelson | B29C 70/44 264/40.1 |
| 2011/0127698 | A1* | 6/2011 | Alenby | B29C 70/44 264/510 |
| 2012/0258276 | A1* | 10/2012 | Modin | B29C 70/443 428/98 |
| 2012/0280414 | A1* | 11/2012 | Giurgiutiu | B29C 35/0288 264/40.1 |
| 2014/0216634 | A1* | 8/2014 | Hanks | B32B 38/08 156/98 |
| 2014/0327190 | A1* | 11/2014 | Ballow | B29C 33/68 264/571 |
| 2015/0090005 | A1* | 4/2015 | Thomas | G01M 3/04 73/40 |
| 2015/0123299 | A1* | 5/2015 | Wardropper | B29C 70/44 264/40.1 |
| 2015/0174835 | A1* | 6/2015 | Hansen | B29C 70/54 264/40.7 |
| 2016/0082710 | A1* | 3/2016 | Coxon | B29C 70/54 156/285 |
| 2017/0100894 | A1* | 4/2017 | Burns | G05B 19/182 |
| 2017/0252982 | A1* | 9/2017 | Knutson | B29C 70/342 |
| 2017/0274560 | A1* | 9/2017 | Taketa | B29C 70/443 |
| 2018/0257314 | A1* | 9/2018 | Destories | B29C 70/46 |
| 2019/0039335 | A1* | 2/2019 | Caprez | B29C 45/73 |
| 2019/0240876 | A1* | 8/2019 | Lee | B29C 70/44 |

OTHER PUBLICATIONS http://www.sensorprod.com/pressurex_micro.php.
GCC Patent Office, Office Action, with English translation, App. No. 2019-37813 (dated Jun. 22, 2021).

* cited by examiner

APPARATUS AND METHOD FOR FACILITATING A VACUUM BAGGING OPERATION DURING FABRICATION OF A COMPOSITE LAMINATE

FIELD

The present application relates to vacuum bagging machines and, in particular, to an apparatus and method for facilitating a vacuum bagging operation during fabrication of a composite laminate, such an aircraft skin panel with stringers.

BACKGROUND

A known vacuum bagging machine for bagging an uncured skin panel with stringers uses a gantry to rollout a polymer film which is manipulated to function as a vacuum bag for the skin panel with stringers. The skin panel with stringers is lying on a layup mandrel (or cure tool) when the vacuum bag is rolled out. One or more operating personnel form pleats in the vacuum bag so that the originally planar film is able to contour to the skin and stringers. Each pleat is often formed into position over a corresponding stringer along the entire length of the skin panel, however, additional pleats may be necessary to assure fit to the contour.

When a vacuum is drawn in the vacuum bag, the material of the bag deforms (i.e., stretches) in the vicinity of each stringer due to contour. Pressure on the vacuum bag during cure removes air (i.e. porosity) in the curing laminates. Even with pleats, it is difficult for the bag to contour exactly to the complex inner surface of a skin panel with stringers. If pressure is used to deform the bag to contour, then laminate consolidation pressure is reduced. This reduction in pressure causes variations in consolidation pressure, resulting in variations in thickness of the subsequently-formed composite laminate (i.e., the cured skin panel). These laminate thickness variations occur because resin in the vacuum bag flows from higher pressure areas to lower pressure areas. For example, a pressure variation of about one percent could result in a laminate thickness variation of about 0.002 inch. Accordingly, those skilled in the art continue with research and development efforts in the field of vacuum bagging used in the fabrication of composite laminates such as aircraft skin panels with stringers.

SUMMARY

In one aspect, a method is provided for vacuum bagging. The method comprises applying a vacuum bag, and sensing vacuum bag stress levels.

In another aspect, a method is provided for facilitating a vacuum bagging operation during fabrication of a composite laminate. The method comprises applying a vacuum bag over a composite part to fabricate the composite laminate from the composite part. The method also comprises drawing a vacuum in the vacuum bag, and monitoring one or more portions of the vacuum bag for strain within the vacuum bag when the vacuum is drawn. The method further comprises manipulating the vacuum bag to even out strain within the vacuum bag.

In yet another aspect, an apparatus is provided for facilitating a vacuum bagging operation. The apparatus comprises a vacuum bag, and digital indicia disposed on one or more surface portions of the vacuum bag to enable vacuum bag stress levels to be monitored when a vacuum is drawn in the vacuum bag.

Other aspects will become apparent from the following detailed description, the accompanying drawings and the appended claims.

DETAILED DESCRIPTION

The present application is directed to an apparatus and method for facilitating a vacuum bagging operation during fabrication of a composite laminate, such an aircraft skin panel with stringers. The specific construction of the apparatus and the industry in which the apparatus and method are implemented may vary. It is to be understood that the disclosure below provides a number of embodiments or examples for implementing different features of various embodiments. Specific examples of components and arrangements are described to simplify the present disclosure. These are merely examples and are not intended to be limiting.

By way of example, the disclosure below describes an apparatus and method for bagging an uncured composite skin panel for an airplane. The apparatus and method may be implemented by an original equipment manufacturer (OEM) in compliance with commercial regulations or military and space regulations, depending upon the particular application.

Figure 1:
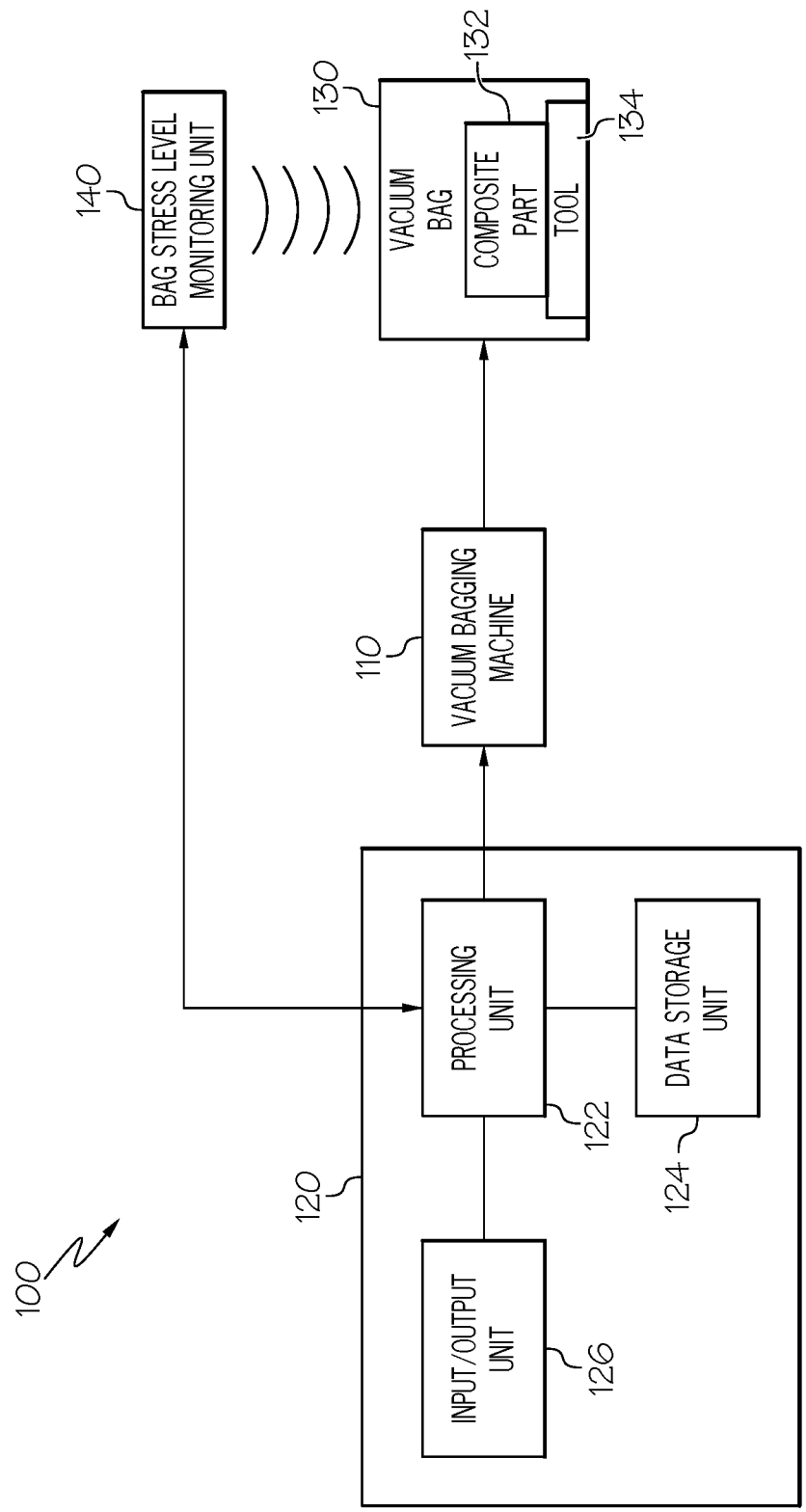
FIG. 1 is a schematic view showing an example apparatus for facilitating a vacuum bagging operation during fabrication of a composite laminate in accordance with an embodiment.

Referring to FIG. 1, a schematic view showing an example apparatus 100 for facilitating a vacuum bagging operation during fabrication of a composite laminate in accordance with an embodiment is illustrated. The apparatus 100 comprises a vacuum bagging machine 110 and a computer system 120 capable of controlling the vacuum bagging machine 110. Structure and operation of vacuum bagging machines are known and conventional and, therefore, will not be described.

The computer system 120 includes a processing unit 122 that executes instructions stored in an internal data storage unit 124, an external data storage unit (not shown), or a combination thereof. The processing unit 122 may comprise any type of technology. For example, the processing unit 122 may comprise a general-purpose electronic processor. Other types of processors and processing unit technologies are possible. The internal data storage unit 124 may comprise any type of technology. For examples, the internal data storage unit 124 may comprise random access memory (RAM), read only memory (ROM), solid state memory, or any combination thereof. Other types of memories and data storage unit technologies are possible.

The computer system 120 further includes a number of input/output (I/O) devices 126 that may comprise any type of technology. For example, the I/O devices 126 may comprise a keypad, a keyboard, a touch-sensitive display screen, a liquid crystal display (LCD) screen, a microphone, a speaker, or any combination thereof. Other types of I/O devices and technologies are possible.

The processing unit 122 controls the vacuum bagging machine 110 to control the extent to which a vacuum is drawn in a vacuum bag 130 which is disposed over an uncured composite part 132 which, in turn, is disposed on a tool 134. A composite laminate is fabricated from the composite part 132 by drawing the vacuum in the vacuum bag 130 in a known manner and then allowing the composite part 132 to cure. The vacuum bag 130 has a surface with digital indicia printed thereon.

Figure 2:
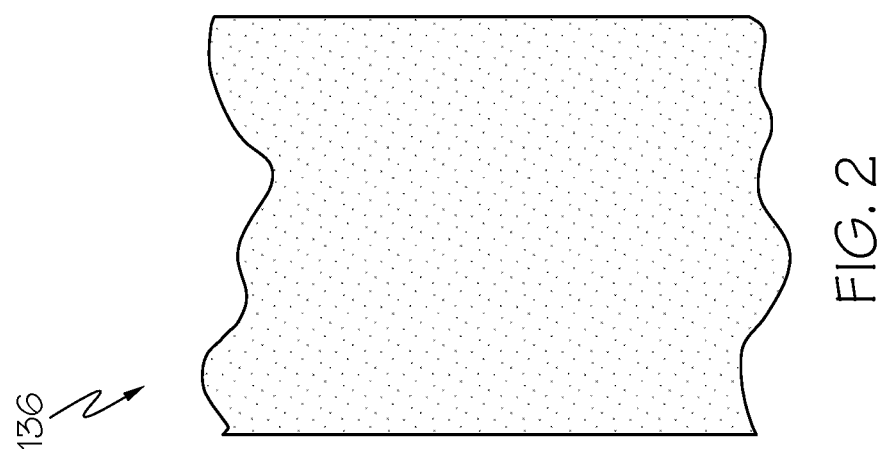
FIG. 2 is a schematic view of digital indicia on a vacuum bag in accordance with an embodiment.

Referring to FIG. 2, an example digital indicia pattern 136 that can be printed on the surface of the vacuum bag 130 is shown. The example digital indicia pattern 136 comprises a random speckle pattern of black spots on a white background. Other digital indicia patterns are possible.

Figure 3:
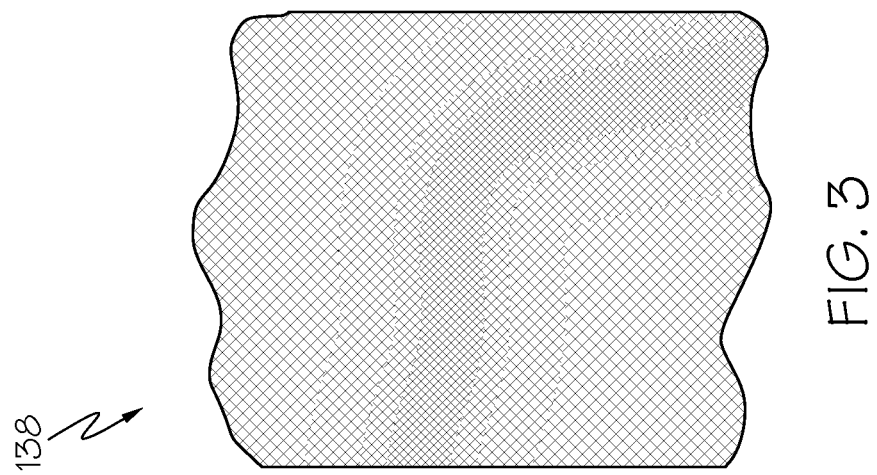
FIG. 3 is a schematic view of digital indicia on a vacuum bag in accordance with another embodiment.

Referring to FIG. 3, another example digital indicia pattern 138 that can be printed on the surface of the vacuum bag 130 is shown. The example digital indicia pattern 138 comprises a mechano-chromatic material that changes color in response to stress being applied to the vacuum bag 130. The different shades of the example digital indicia pattern 138 shown in FIG. 3 represent changes in color. Other digital indicia patterns are possible.

The apparatus 100 further comprises a bag stress level monitoring unit 140 (FIG. 1) that detects stress levels in the vacuum bag 130. More specifically, the bag stress level monitoring unit 140 monitors one or more portions of the vacuum bag 130 for strain within the vacuum bag 130 when the vacuum is drawn.

In some embodiments, the bag stress level monitoring unit 140 comprises a system that uses digital image correlation techniques to detect stress levels in the vacuum bag 130. The example digital indicia pattern 136 of digital indicia shown in FIG. 2 is particularly suitable when digital image correlation techniques are applied to detect stress levels in the vacuum bag 130.

An example system that uses digital image correlation techniques is the ARAMIS™ three-dimensional motion and deformation sensor, which is commercially available from GOM International AG located in Switzerland. Other suitable systems using digital image correlation techniques may be used. Briefly, the ARAMIS™ system has a number of cameras and is a non-contact and material-independent measuring system based on digital image correlation techniques. The ARAMIS™ system provides a stable solution for full-field and point-based analyses of test objects of a few millimeters up to structural components of several meters in size. The ARAMIS™ system performs high-precision measurements with a 3D measurement resolution in the sub-micrometer range, regardless of the specimen geometry and temperature. Moreover, there is no need for a time-consuming and expensive preparation of the system. The ARAMIS™ system also provides accurate 3D coordinates, 3D displacements, velocities, accelerations, surface strain, and evaluations of six degrees of freedom for either statically or dynamically loaded specimens and components.

During operation of the ARAMIS™ system, the pressure in the vacuum bag 130 is cycled (e.g., pulsed) so that higher stress locations in the vacuum bag 130 can be detected. Depending upon the number of cameras used, either a 2D or a 3D strain map (e.g., a topographical strain map) is provided. The higher stress locations are manipulated (which could be manually by hand) to even out strain within the vacuum bag 130. Once the stress/strain state of the vacuum bag 130 is relatively uniform, the composite part 132 in the vacuum bag 130 is allowed to cure and thereby to form a composite laminate. Since strain within the vacuum bag 130 has been evened out, cure pressure and thickness variations of the fabricated composite laminate are evened out.

In some embodiments, the bag stress level monitoring unit 140 comprises a human operator who visually monitors one or more portions of the vacuum bag 130 for strain within the vacuum bag 130. The example digital indicia pattern 138 shown in FIG. 3 is particularly suitable when a human operator visually monitors one or more portions of the vacuum bag 130 to detect stress levels in the vacuum bag 130. The example digital indicia pattern 138 on the vacuum bag 130 may result from a pressure-sensitive material that has at least one characteristic (e.g., paint, tape, print, or fluorescence) that provides a visual change in color in response to detecting a change in pressure over a surface of the composite part 132. The change in color could be detectable in the visible range, or could be detectable in other ranges such as the ultraviolet range or the infrared range.

The example digital indicia pattern 138 on the vacuum bag 130 may result from a strain-chromatic material (i.e., a mechano-chromatic material) that changes color due to strain. The change in color could be detectable in the visible range, or could be detectable in other ranges such as the ultraviolet range or the infrared range.

During operation, the vacuum in the vacuum bag 130 is applied (i.e., drawn) as the human operator visually monitors the pressure-sensitive material (or strain-chromatic material) that provides a visual color change. The higher pressure locations are manipulated (which could be manually by hand) to even out strain within the vacuum bag 130. Once the stress/strain state of the vacuum bag 130 is visually uniform, the composite part 132 in the vacuum bag 130 is allowed to cure and thereby to form a composite laminate. Since strain within the vacuum bag 130 has been evened out, the resulting cure pressure and thickness variations of the fabricated composite laminate are evened out.

In some embodiments, the bag stress level monitoring unit 140 comprises a system that uses shearography techniques (e.g., laser shearography techniques) to detect stress levels in the vacuum bag 130. In this case, no digital indicia are required to be printed on the vacuum bag 130. Briefly, the shearography-based system detects stress gradients in the surface of the vacuum bag 130. Shearography uses a common path interferometer to image the first derivative of the out-of-plane deformation of the surface of the composite part 132 in response to a change in vacuum level in the vacuum bag 130. An example system that uses shearography techniques is LTI™ 5000-series digital shearography system, which is commercially available from Laser Technology, Inc., located in Norristown, Pa. Other suitable shearography systems may be used.

During operation of the shearography-based system, shearography data is captured at different pressures (i.e., at different vacuum levels in the vacuum bag 130) that visibly indicate differences in bag stress levels over the entire composite part 132. The higher stress locations are manipulated (which could be manually by hand) to even out strain within the vacuum bag 130. By using a shearography-based system, shearography data can be captured while the vacuum bag is being manipulated to even out strain within the vacuum bag. Once the stress/strain state of the vacuum bag 130 is relatively uniform, the composite part 132 in the vacuum bag 130 is allowed to cure and thereby to form a composite laminate. Since strain within the vacuum bag 130 has been evened out, the resulting cure pressure and thickness variations of the fabricated composite laminate are evened out.

Although the above description describes the bag stress level monitoring unit 140 of FIG. 1 being based on certain technologies (e.g., digital image correlation, pressure-sensitive materials, strain-chromatic materials, and shearography), it is conceivable that the bag stress level monitoring unit 140 may be based on other technologies. For example, the bag stress level monitoring unit 140 may comprise a chromatic-based system, a polarization-based system, a reflection-based system, or a system that analyzes Moiré fringe patterns. Pattern changes, such as dot changes, spot changes, line changes, or checkerboard changes, are monitored. It is also conceivable that different types of sensors be incorporated in the vacuum bag 130. For example, pressure sensors could be added to (e.g., incorporated directly into) a film that is placed locally in only critical areas of the vacuum bag 130. Alternatively, a chromatic pigment could be added to the film. As another example, fiber-optic gauges could be embedded into the material of the vacuum bag 130.

Figure 4:
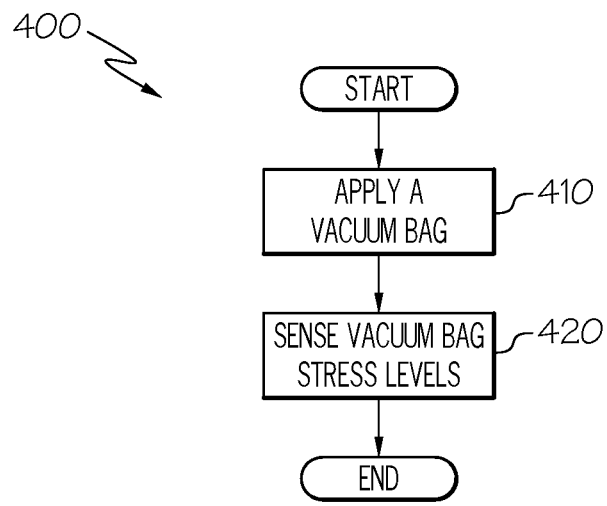
FIG. 4 is a flow diagram depicting an example method for facilitating a vacuum bagging operation in accordance with an embodiment.

Referring to FIG. 4, flow diagram 400 depicts an example method for operating the example computer system 120 of FIG. 1 to control operation of the vacuum bagging machine 110 in accordance with an embodiment. The stress level of the vacuum bag can be monitored before, during, or after evacuation of the vacuum bag. In block 410, a vacuum bag is applied. Then in block 420, vacuum bag stress levels are sensed. The process then ends.

In some embodiments, portions of the vacuum bag are manipulated based on the sensed vacuum bag stress levels to even out vacuum bag stress levels. In some embodiments, portions of the vacuum bag are locally deformed or stretched based on the sensed vacuum bag stress levels to even out vacuum bag stress levels.

In some embodiments, the vacuum bag is forced to slip or slide relative to preform features of the vacuum bag to even out vacuum bag stress levels. In some embodiments, at least a portion of the vacuum bag is relocated relative to preform features of the vacuum bag to even out vacuum bag stress levels. In some embodiments, the vacuum bag is pleated strategically relative to preform features of the vacuum bag.

In some embodiments, printed digital indicia are coupled on the vacuum bag. In some embodiments, the vacuum bag is imaged with the printed digital indicia.

In some embodiments, shearography data is captured at various positions of the vacuum bag. In some embodiments, the vacuum bag is at least partially evacuated prior to capturing shearography data at various positions of the vacuum bag, thereby establishing a tension/strain state prior to capturing data. In some embodiments, shearography data is captured at various positions of the vacuum bag while evening out vacuum bag stress levels.

Figure 5:
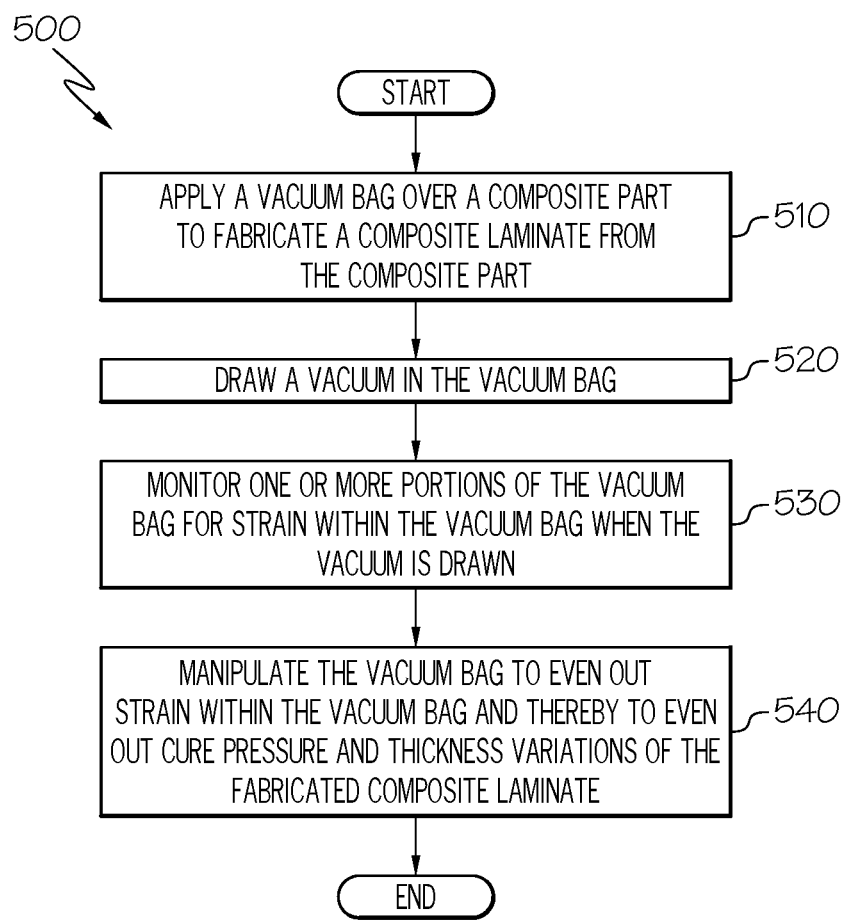
FIG. 5 is a flow diagram depicting an example method for facilitating a vacuum bagging operation in accordance with another embodiment.

Referring to FIG. 5, flow diagram 500 depicts an example method for operating the example computer system of FIG. 1 to control operation of the vacuum bagging machine 110 to facilitate a vacuum bagging operation during fabrication of a composite laminate in accordance with an embodiment. In block 510, a vacuum bag is applied over a composite part to fabricate the composite laminate from the composite part. Then in block 520, a vacuum is drawn in the vacuum bag. The process proceeds to block 530 in which one or more portions of the vacuum bag are monitored for strain within the vacuum bag when the vacuum is drawn. The vacuum bag is manipulated, as shown in block 540, to even out strain within the vacuum bag and thereby to even out cure pressure and thickness variations of the fabricated composite laminate. The process then ends.

In some embodiments, the one or more portions of the vacuum bag are optically monitored for strain within the vacuum bag. In some embodiments, digital image correlation techniques are applied to detect stress gradients on a surface of the vacuum bag.

In some embodiments, the one or more portions of the vacuum bag are visually monitored for strain within the vacuum bag by way of a non-human. For example, the visual monitoring may be performed by a computerized imaging system, such as a computerized imaging system that includes a camera in communication with a computer/processor running image processing software.

In some embodiments, a pressure-sensitive material that provides a visual change in at least one characteristic of the pressure-sensitive material is visually monitored. In some embodiments, the pressure-sensitive material the pressure-sensitive material is visually monitored for a color change. In some embodiments, a strain-chromatic material that provides a visual change in at least one characteristic of the strain-chromatic material is visually monitored. In some embodiments, the strain-chromatic material is visually monitored for a color change.

In some embodiments, shearography techniques are applied to capture shearography data to detect stress gradients on a surface of the vacuum bag. In some embodiments, shearography data is captured to detect stress gradients on a surface of the vacuum bag while manipulating the vacuum bag to even out strain within the vacuum bag and thereby to even out cure pressure and thickness variations of the fabricated composite laminate.

In some embodiments, the vacuum bag is manually manipulated to even out strain within the vacuum bag.

In some embodiments, the method is performed by a computer having a memory executing one or more programs of instructions which are tangibly embodied in a program storage medium readable by the computer.

It should be apparent that the above-described apparatus 100 reduces cure pressure and thickness variations in the cured composite laminate. The composite laminate has at least consistent thickness variations that do not exceed a desired threshold. The result is at least consistent shimming (when needed) of the fabricated composite laminates, or ideally no shimming (i.e., shim less) required of the fabricated composite laminates. This not only reduces labor costs, but also reduces the time needed to fabricate composite laminates in a production setting. Moreover, scrap, rework, and corrective actions such as shimming, are eliminated or at least reduced. Thus, total production costs are reduced.

It should also be apparent that the above-described apparatus 100 facilitates not only the vacuum bagging operation, but also facilitates the subsequent autoclaving operation from which the cured composite laminates are ultimately obtained. In the case of where a vacuum bag bridges at an edge of the composite laminate (e.g., at an edge of a stringer of a skin panel), the reduction of vacuum bag stress levels during the vacuum bagging operation results in a reduction of resin flowing out of the composite laminate into the lower pressure areas between the vacuum bag and the edge of the composite laminate during the autoclaving operation. Similarly, in the case of where a vacuum bag bridges over a caul plate that is on the composite laminate, the reduction of vacuum bag stress levels during the vacuum bagging operation results in a reduction of resin flowing out of the composite laminate into the lower pressure areas between the vacuum bag and an edge of the caul plate during the autoclaving operation. In both of these cases, any decrease in thickness of the composite laminate due to resin flowing out of the composite laminate is eliminated, or at least reduced.

Figure 6:
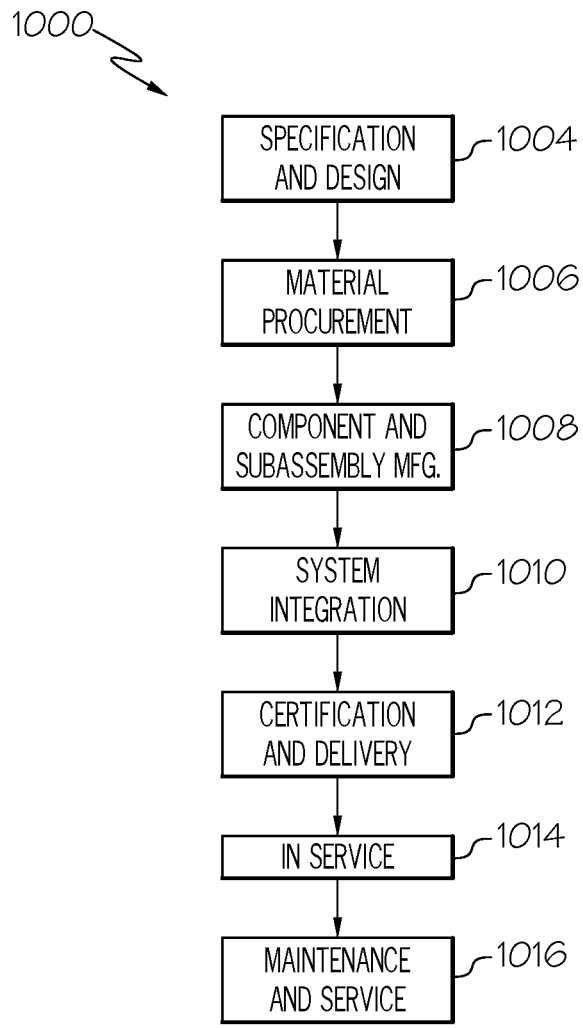
FIG. 6 is a flow diagram of an aircraft manufacturing and service methodology.
Figure 7:
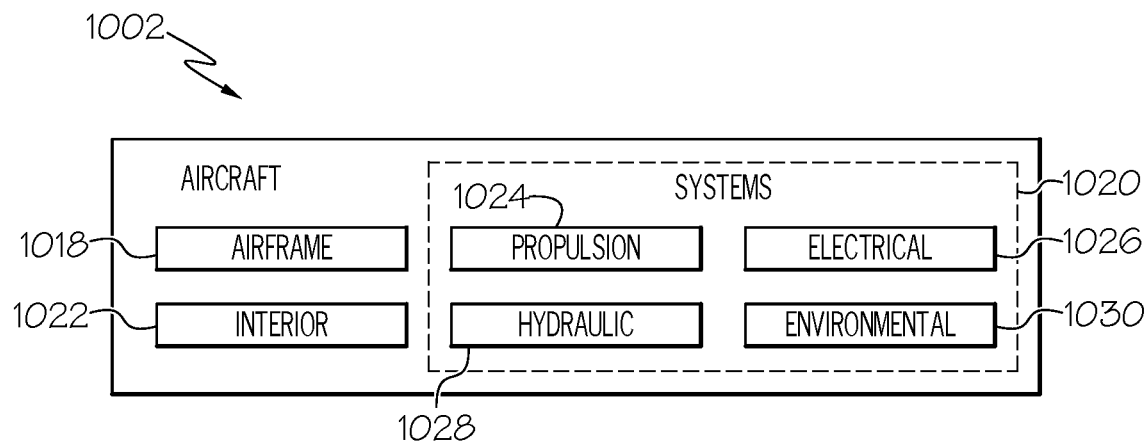
FIG. 7 is a block diagram of an aircraft.

Examples of the disclosure may be described in the context of an aircraft manufacturing and service method 1000, as shown in FIG. 6, and an aircraft 1002, as shown in FIG. 7. During pre-production, the aircraft manufacturing and service method 1000 may include specification and design 1004 of the aircraft 1002 and material procurement 1006. During production, component/subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine maintenance and service 1016, which may also include modification, reconfiguration, refurbishment and the like.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 7, the aircraft 1002 produced by example method 1000 may include an airframe 1018 with a plurality of systems 1020 and an interior 1022. Examples of the plurality of systems 1020 may include one or more of a propulsion system 1024, an electrical system 1026, a hydraulic system 1028, and an environmental system 1030. Any number of other systems may be included.

The disclosed apparatus and method may be employed during any one or more of the stages of the aircraft manufacturing and service method 1000. As one example, components or subassemblies corresponding to component/subassembly manufacturing 1008, system integration 1010 and/or maintenance and service 1016 may be assembled using the disclosed apparatus and method. As another example, the airframe 1018 may be constructed using the disclosed apparatus and method. Also, one or more apparatus examples, method examples, or a combination thereof may be utilized during component/subassembly manufacturing 1008 and/or system integration 1010, for example, by substantially expediting assembly of or reducing the cost of an aircraft 1002, such as the airframe 1018 and/or the interior 1022. Similarly, one or more of apparatus examples, method examples, or a combination thereof may be utilized while the aircraft 1002 is in service, for example and without limitation, to maintenance and service 1016.

Aspects of disclosed embodiments may be implemented in software, hardware, firmware, or a combination thereof. The various elements of the apparatus and method, either individually or in combination, may be implemented as a computer program product tangibly embodied in a machine-readable storage device for execution by a processor. Various steps of embodiments may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed embodiments can be loaded onto a computer.

The above-described apparatus and method are described in the context of an aircraft. However, one of ordinary skill in the art will readily recognize that the disclosed apparatus and method are suitable for a variety of applications, and the present disclosure is not limited to aircraft manufacturing applications. For example, the disclosed apparatus and method may be implemented in various types of vehicles including, for example, helicopters, passenger ships, automobiles, marine products (boat, motors, etc.) and the like. Non-vehicle applications are also contemplated.

Although the above-description describes digital indicia on the vacuum bag being used to enable vacuum bag stress levels to be monitored, it is conceivable that the digital indicia can be used during placement or adjustment of the vacuum bag during installation. It is also conceivable that the digital indicia can be used during processing of a preform, or while locating the vacuum bag prior to curing the preform. Other uses of the digital indicia are possible.

Also, although the above-description describes an apparatus and method for facilitating a vacuum bagging operation during fabrication of a composite laminate, such an aircraft skin panel with stringers, for an airplane part in the aviation industry in accordance with military and space regulations, it is contemplated that the apparatus and method may be implemented to facilitate a vacuum bagging operation in any industry in accordance with the applicable industry standards. The specific apparatus and method can be selected and tailored depending upon the particular application.

Further, although various aspects of disclosed embodiments have been shown and described, modifications may occur to those skilled in the art upon reading the specification. The present application includes such modifications and is limited only by the scope of the claims.

What is claimed is:

1. A method for vacuum bagging comprising:
applying a vacuum bag, the vacuum bag comprising an interior surface configured to face a composite part, an exterior surface opposite the interior surface, and a pattern of indicia disposed on at least a portion of the exterior surface;
detecting vacuum bag stress levels in at least a portion of the vacuum bag by detecting a change in the pattern of indicia using an optical monitoring unit; and
manipulating at least a portion of the vacuum bag based on detected vacuum bag stress levels to even out the vacuum bag stress levels.

2. The method of claim 1 wherein manipulating at least a portion of the vacuum bag based on the detected vacuum bag stress levels to even out vacuum bag stress levels includes:
locally deforming or stretching at least a portion of the vacuum bag based on the detected vacuum bag stress levels to even out vacuum bag stress levels.

3. The method of claim 1 wherein manipulating at least a portion of the vacuum bag based on the detected vacuum bag stress levels to even out vacuum bag stress levels includes:
forcing the vacuum bag to slip or slide relative to preform features of the vacuum bag to even out vacuum bag stress levels.

4. The method of claim 1 wherein manipulating at least a portion of the vacuum bag based on the detected vacuum bag stress levels to even out vacuum bag stress levels includes:
relocating at least a portion of the vacuum bag relative to preform features of the vacuum bag to even out vacuum bag stress levels.

5. The method of claim 1 wherein manipulating at least a portion of the vacuum bag based on the detected vacuum bag stress levels to even out vacuum bag stress levels includes:
pleating the vacuum bag strategically relative to preform features of the vacuum bag.

6. The method of claim 1 further comprising:
printing the pattern of indicia on the exterior surface of the vacuum bag,
wherein the pattern of indicia is a digital indicia pattern.

7. The method of claim 6 further comprising:
imaging the exterior surface of the vacuum bag with the digital indicia pattern to detect a deformation in the digital indicia pattern; and
correlating the deformation in the digital indicia pattern to the vacuum bag stress levels.

8. A method for facilitating a vacuum bagging operation during fabrication of a composite laminate, the method comprising:
applying a vacuum bag over a composite part to fabricate the composite laminate from the composite part;
drawing a vacuum in the vacuum bag;
optically monitoring one or more portions of the vacuum bag to detect strain within the vacuum bag when the vacuum is drawn; and
manipulating the vacuum bag based on detected strain to even out the strain within the vacuum bag.

9. The method of claim 8 wherein manipulating the vacuum bag to even out strain within the vacuum bag includes:
manipulating the vacuum bag to even out strain within the vacuum bag and thereby to even out cure pressure and thickness variations of the fabricated composite laminate.

10. The method of claim 8 wherein optically monitoring the one or more portions of the vacuum bag for strain within the vacuum bag includes:
applying digital image correlation techniques to detect stress gradients on a surface of the vacuum bag.

11. The method of claim 8 wherein optically monitoring one or more portions of the vacuum bag for strain within the vacuum bag when the vacuum is drawn includes:
visually monitoring the one or more portions of the vacuum bag for strain within the vacuum bag.

12. The method of claim 11 wherein:
the vacuum bag comprises a surface and a pressure-sensitive material disposed on at least a portion of the surface;
the pressure-sensitive material is configured to provide a visible change in at least one characteristic of the pressure-sensitive material in response to strain in the vacuum bag; and
visually monitoring the one or more portions of the vacuum bag for strain within the vacuum bag includes:
visually monitoring the visible change in at least one characteristic of the pressure-sensitive material.

13. The method of claim 12 wherein:
the at least one characteristic of the pressure-sensitive material is color; and
visually monitoring the visible change in at least one characteristic of the pressure-sensitive material includes:
visually monitoring the pressure-sensitive material for a color change.

14. The method of claim 11 wherein:
the vacuum bag comprises a surface and a strain-chromatic material disposed on at least a portion of the surface;
the strain-chromatic material is configured to provide a visible change in at least one characteristic of the strain-chromatic material in response to strain in the vacuum bag; and
visually monitoring the one or more portions of the vacuum bag for strain within the vacuum bag includes:
visually monitoring the visible change in at least one characteristic of the strain-chromatic material.

15. The method of claim 14 wherein:
the at least one characteristic of the strain-chromatic material is color; and
visually monitoring the visible change in at least one characteristic of the strain-chromatic material includes:
visually monitoring the strain-chromatic material for a color change.

16. The method of claim 8 wherein optically monitoring one or more portions of the vacuum bag for strain within the vacuum bag includes:
applying shearography techniques to detect stress gradients on a surface of the vacuum bag.

17. An apparatus for facilitating a vacuum bagging operation, the apparatus comprising:
a vacuum bag comprising an interior surface configured to face a composite part and an exterior surface opposite the interior surface;
a pattern of indicia disposed on at least a portion of the exterior surface of the vacuum bag;
an optical monitoring unit configured to detect a change in the pattern of indicia; and
a computer system adapted to correlate the change in the pattern of indicia to vacuum bag stress levels in the vacuum bag and to detect the vacuum bag stress levels in the vacuum bag when a vacuum is drawn in the vacuum bag,
wherein the vacuum bag is configured to be manipulated to even out the vacuum bag stress levels in response to detected vacuum bag stress levels.

18. The method of claim 1 wherein manipulating at least a portion of the vacuum bag based on the detected vacuum bag stress levels to even out vacuum bag stress levels includes:
manually manipulating the vacuum bag.

19. A method for vacuum bagging comprising:
applying a vacuum bag;
sensing vacuum bag stress levels by capturing shearography data at various positions of the vacuum bag; and
manipulating portions of the vacuum bag based on sensed vacuum bag stress levels to even out vacuum bag stress levels.

20. The method of claim 19 further comprising:
at least partially evacuating the vacuum bag; and
capturing the shearography data after at least partially evacuating the vacuum bag.

21. The method of claim 19 wherein capturing shearography data at various positions of the vacuum bag includes:
applying shearography techniques to detect stress gradients on a surface of the vacuum bag.

22. The method of claim 19 wherein capturing shearography data at various positions of the vacuum bag is performed while evening out vacuum bag stress levels.

23. The method of claim 19 further comprising:
applying the vacuum bag comprises:
applying the vacuum bag over a composite part to fabricate a composite laminate from the composite part; and
drawing a vacuum in the vacuum bag; and manipulating portions of the vacuum bag based on the sensed vacuum bag stress levels to even out vacuum bag stress levels results in evening out a cure pressure and thickness variations of the fabricated composite laminate.

* * * * *